United States Patent
Liu et al.

(10) Patent No.: US 10,606,219 B2
(45) Date of Patent: Mar. 31, 2020

(54) POWER SUPPLY DEVICE, POWER TRANSFERRING DEVICE AND METHODS THEREOF

(71) Applicant: Wistron Corporation, New Taipei (TW)

(72) Inventors: Wei-Lun Liu, New Taipei (TW); Sheng-Hung Wang, New Taipei (TW); Lee-Chun Ko, New Taipei (TW)

(73) Assignee: Wistron Corporation, New Taipei (TW)

( * ) Notice: Subject to any disclaimer, the term of this patent is extended or adjusted under 35 U.S.C. 154(b) by 235 days.

(21) Appl. No.: 15/705,262

(22) Filed: Sep. 15, 2017

(65) Prior Publication Data

US 2018/0341232 A1 Nov. 29, 2018

(30) Foreign Application Priority Data

May 23, 2017 (TW) .............................. 106116968 A

(51) Int. Cl.
*G05B 13/02* (2006.01)
*G06F 1/26* (2006.01)

(52) U.S. Cl.
CPC ......... *G05B 13/0205* (2013.01); *G06F 1/266* (2013.01)

(58) Field of Classification Search
CPC .............................. G05B 13/0205; G06F 1/266
USPC .......................................................... 307/31
See application file for complete search history.

(56) References Cited

U.S. PATENT DOCUMENTS

| | | | | |
|---|---|---|---|---|
| 2011/0006603 A1* | 1/2011 | Robinson | ................ | G06F 1/263 307/31 |
| 2011/0239022 A1* | 9/2011 | Tokoro | ..................... | G06F 1/266 713/323 |
| 2014/0052836 A1* | 2/2014 | Nguyen | ................ | H04L 45/306 709/223 |
| 2015/0207318 A1* | 7/2015 | Lowe | .................. | H02J 13/0003 307/24 |
| 2017/0207627 A1* | 7/2017 | Ichino | ....................... | H02J 3/14 |
| 2019/0036715 A1* | 1/2019 | Rohrbacher | ........... | H04B 3/544 |

\* cited by examiner

*Primary Examiner* — Hal Kaplan
*Assistant Examiner* — Swarna N Chowdhuri
(74) *Attorney, Agent, or Firm* — JCIPRNET

(57) ABSTRACT

A power supply device which can be connected to an external device and flexibly distribute power is provided. A control circuit of the power supply device, when detecting that a shell connecting point of the power supply device is electrically connected to an external connecting point of a first external device, determines whether a type of the first external device is a load device and records device information related to the first external device in a power routing table. If yes, the control circuit transmits the power routing table to the first external device and then, instructs the power routing circuit to adjust a switch thereof according to a path table returned from the first external device so as to power the first external device. A power transferring device, a power supply method and a power transferring method are also provided.

7 Claims, 10 Drawing Sheets

POWER SUPPLY DEVICE, POWER TRANSFERRING DEVICE AND METHODS THEREOF

CROSS-REFERENCE TO RELATED APPLICATION

This application claims the priority benefit of Taiwan application serial no. 106116968, filed on May 23, 2017. The entirety of the above-mentioned patent application is hereby incorporated by reference herein and made a part of this specification.

BACKGROUND

Field of the Invention

The invention is directed to a power supply device, a power transferring device and methods thereof capable of forming a power network.

Description of Related Art

With the rise of consumer electronics products, for many consumers, owning consumer electronics products is not only for satisfying functional demands, but also considered as a symbol of personal taste. Thus, every manufacturer is devoted to develop a variety of electronic products with distinctive features. Specially, various customized electronic products are particularly popular to users for expressing the users' personal characteristics.

Among them, a kind like toy building bricks with modularized and small-volume features and capable of providing innumerable combinations and changes is more popular. However, brick mobile power supplies presenting in a brick-like type which are available on the market can only be combined with the appearances, without any combinations in functions. As a result such kind of mobile power supplies cannot provide the users with flexible distributions and applications of the power supplies.

SUMMARY

The invention provides a power supply device, a power transferring device and methods thereof capable of flexibly distributing power when the power supply device and the power transferring device are connected with each other.

According to an embodiment of the invention, a power supply device configured to be connected with a plurality of external devices is provided. Each of the external devices includes an external connecting point. The power supply device includes a shell, a power providing unit, a power routing circuit and a control circuit. The shell includes a plurality of shell connecting points. The power providing unit is configured to store and provide power to the external devices. The power routing circuit is coupled to the shell connecting points and the power providing unit and includes a plurality of switches. The control circuit is connected with the power routing circuit and controls the switches of the power routing circuit. When detecting that the external connecting point of a first external device is electrically connected with one of the shell connecting points, the control circuit determines whether a type of the first external device is a load device and records device information related to the first external device in a power routing table. If the type of the first external device is the load device, the control circuit transmits the power routing table to the first external device and instructs the power routing circuit to adjust the switches thereof according to a path table returned from the first external device, so as to power the first external device.

According to an embodiment of the invention, a power supply method for providing power from a power supply device to a plurality of external devices is provided. The power supply device includes a shell, a power providing unit, a power routing circuit and a control circuit. The method includes the following steps. When the external connecting point of a first external device is detected as being electrically connected with a shell connecting point of the shell, device information related to the first external device is recorded in a power routing table. Whether a type of the first external device is a load device is determined. If the type of the first external device is the load device, the power routing table is transmitted to the first external device, and switches of the power routing circuit are adjusted according to a path table returned by the first external device, so as power the first external device.

According to an embodiment of the invention, a power transferring device disposed with a load device and configured to be connected with a power supply device, so as to induce the power supply device to power the load device. The power supply device has a plurality of shell connecting points. The power transferring device has an external connecting point, a control circuit and a power module. The external connecting point is disposed on a surface of the power transferring device. The control circuit is coupled to the external connecting point, receives a power routing table transmitted by the power supply device and generates connection topology information according to the power routing table. The control circuit calculates a path table according to the connection topology information and transmits the path table to the power supply device. The power module receives the power from the power supply device and converts the power into power required by the load device, wherein the power of the power supply device is provided according to the path table.

According to an embodiment of the invention, a power transferring method applicable to a power transferring device disposed with a load device and configured to be connected with a power supply device, so as to induce the power supply device to power the load device is provided. The power transferring method includes the following steps. When a control circuit of the power transferring device is powered, a request for obtaining a power routing table is transmitted to the power supply device to receive the power routing table transmitted by the power supply device. Connection topology information and a power demand table are generated. A path table is calculated according to the connection topology information and the power demand table. The path table is transmitted to the power supply device. And, the power from the power supply device is received and provided to the load device, wherein the power of the power supply device is provided according to the path table.

Based on the above, the power supply device of the invention can record the device information related to each external device connected therewith in the power routing table. And, the power transferring device can establish the connection topology information and the power demand table according to the power routing table and further calculate the path table, such that the power supply can be deployed in the entire power network according to the path table. Thereby, when the user arbitrarily connects the power supply device with the load device, the power transferring device and the power supply device can cooperate with each other to calculate the optimal power supply path for flexibly distributing the power to the load device.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
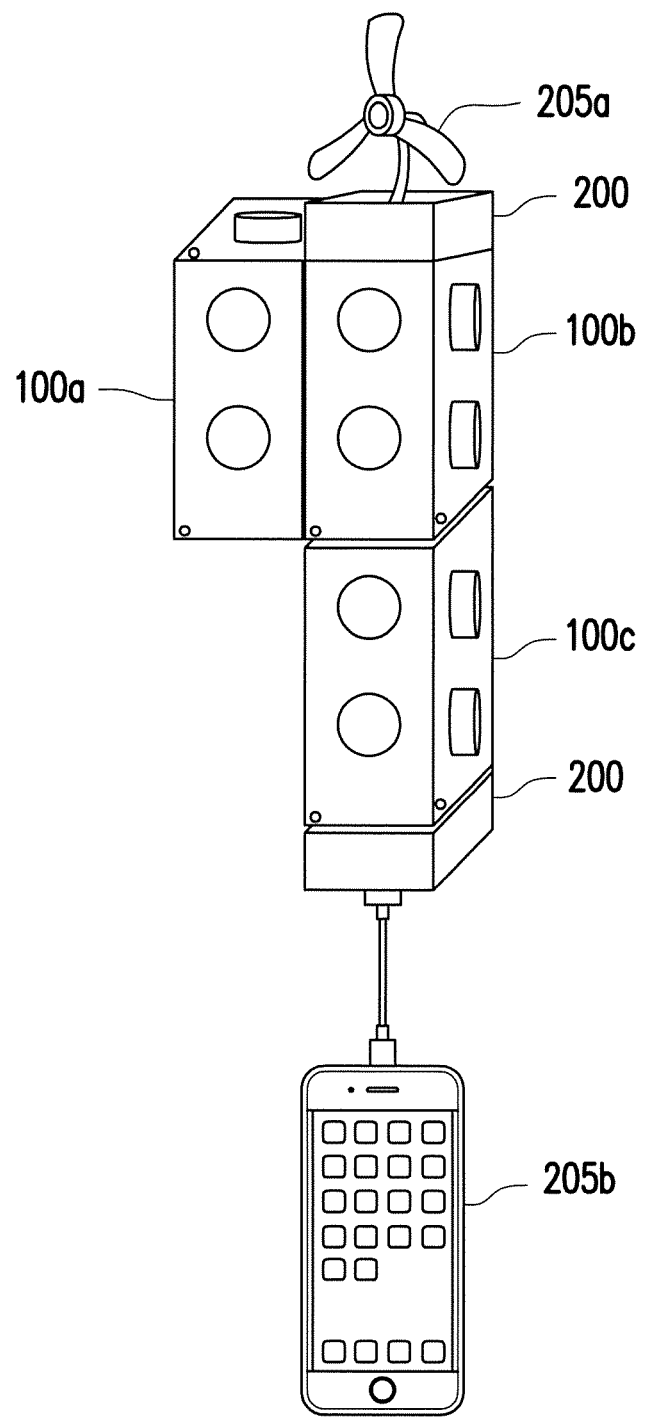
FIG. 1 is a schematic diagram illustrating a system according to an embodiment of the invention.

Referring to FIG. 1, FIG. 1 is a schematic diagram illustrating a system according to an embodiment of the invention. In the present embodiment, power supply devices 100a, 100b and 100c, a power transferring device 200 and load devices 205a and 205b may be designed to assemble together or disassemble from one another. The power supply devices 100a, 100b and 100c of the present embodiment are in a cuboid shape. In other embodiments, the power supply devices 100a, 100b and 100c may also be design in a cube type, a sphere shape and so on, but the invention is not limited thereto. The power transferring device 200 is located between the power supply device 100 and the load devices 205a and 205b and configured to connect the power supply devices 100a, 100b and 100c with the load devices 205a and 205b. The load devices 205a and 205b are devices which need to be powered, such as fans, cell phones, rechargeable headphones, game sticks and so on, which construe no limitations to the invention.

In a nominal situation, a user may assemble the power supply devices 100a, 100b and 100c, so as to provide power to the load devices 205a and 205b through the power transferring device 200. However, the power supply devices 100a, 100b and 100c are merely structurally connected with one another. For example, for the load device 205a, it receives only the power provided from the power supply device 100b, while for the load device 205b, it receives only the power provided from the power supply device 100c. The power supply device 100b and the power supply device 100c do not have mutual power-related connection with each other.

For more efficient power distribution, a power network is formed by circulating the power among the power supply devices 100a, 100b and 100c in the invention, such that the power among the power supply devices 100a, 100b and 100c may be flexibly adjusted and distributed. Embodiments related to internal structures of the power supply device 100a, 100b, 100c and the power transferring device 200 will be provided below in turn for descriptions.

Figure 2:
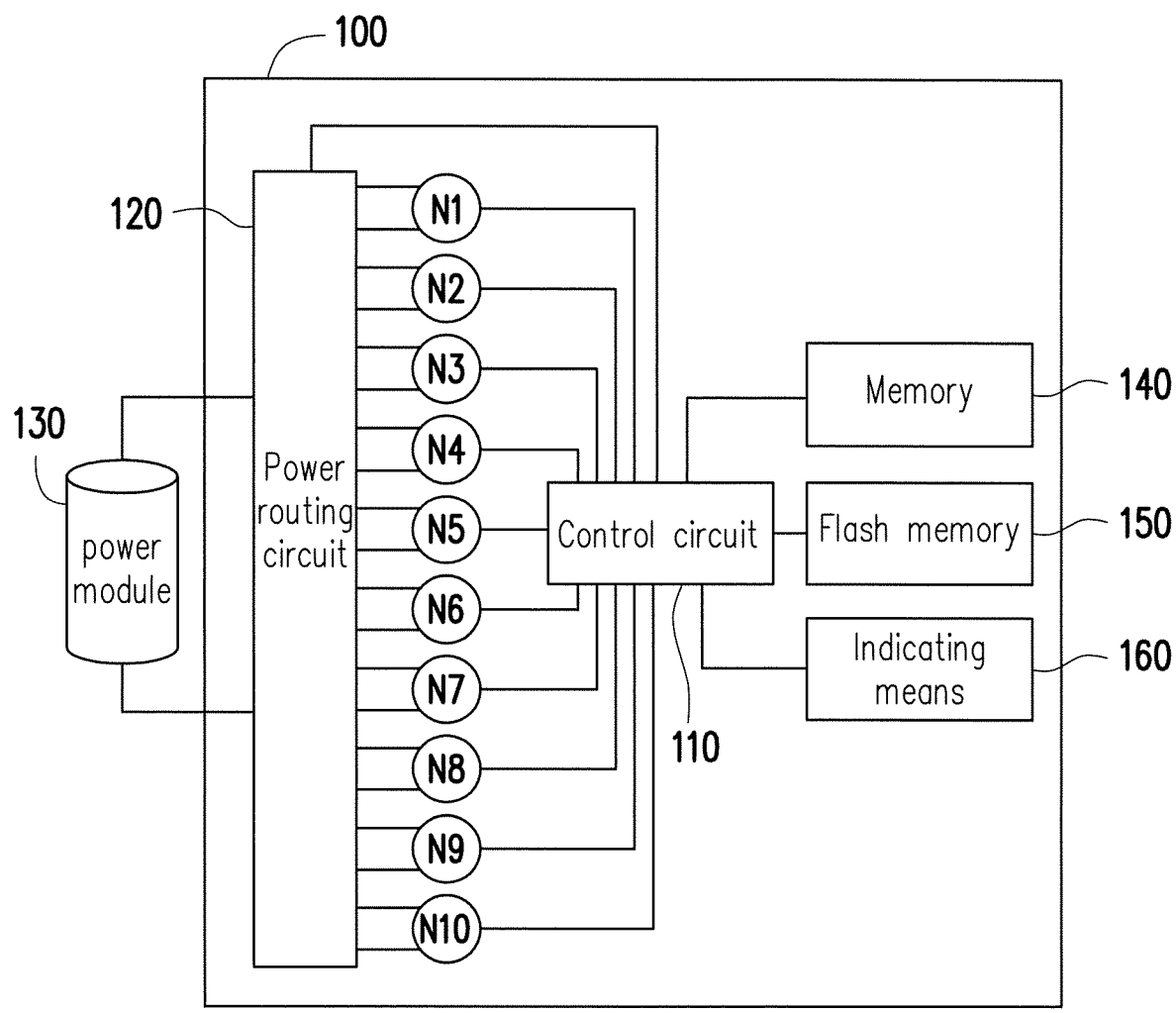
FIG. 2 illustrates an internal structure of a power supply device according to an embodiment of the invention.

Description with respect to the internal structures of the power supply devices 100a and 100b will be exemplarily set forth below. Referring to FIG. 2, FIG. 2 illustrates an internal structure of a power supply device 100 according to an embodiment of the invention. The power supply device 100 includes a plurality of shell connecting points N1 to N10, a control circuit 110, a power routing circuit 120, a power module 130, a memory 140, a flash memory 150 and an indicating means 160.

The control circuit 110 is coupled to the shell connecting points N1 to N10 and the power routing circuit 120. In the present embodiment, the control circuit 110 may be packaged in a chip or laid out in a circuit form in the power supply device 100. The control circuit 110 detects whether the shell connecting points N1 to N10 are connected with other power supply devices or load devices and establishes a power routing table according to a connection scenario. Additionally, the control circuit 110 exchanges information with the power supply devices or the load devices connected therewith for, for example, exchanging power routing tables with each other or connecting topology information through the shell connecting points N1 to N10. And, the control circuit 110 controls the switches in the power routing circuit 120 to adjust the power provided to the load device 205.

Figure 3:
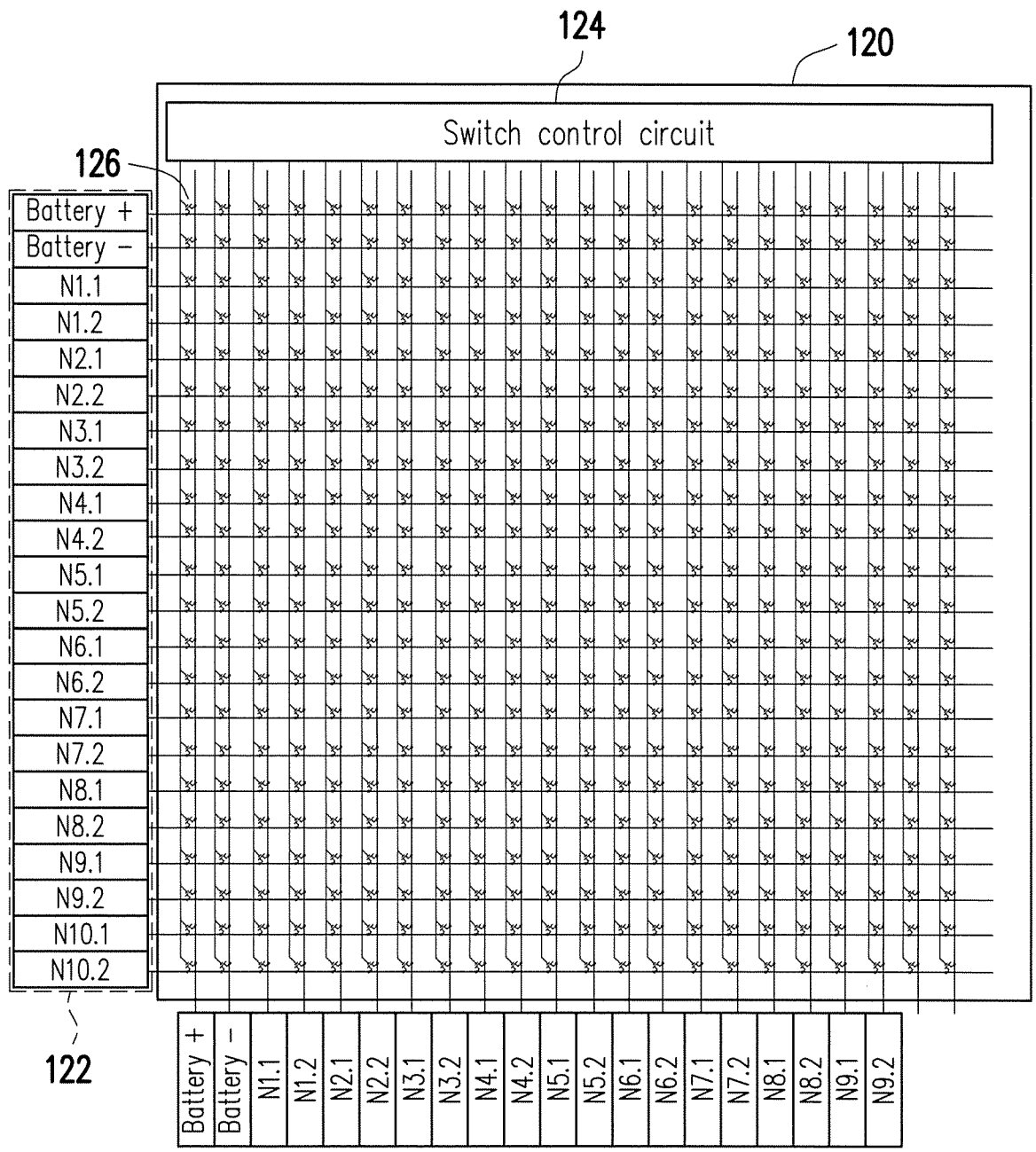
FIG. 3 illustrates a circuit structure of the power routing circuit according to an embodiment of the invention.

The power routing circuit 120 has a plurality of switches and deploys the power provided by the power module 130 to the shell connecting points N1 to N10 according to a path table indicated by the control circuit 110. Specifically, also referring to FIG. 3, FIG. 3 illustrates a circuit structure of the power routing circuit 120 according to an embodiment of the invention. In the invention, the shell connecting points N1 to N10 and the power module 130 are respectively connected with two of a plurality of lines 122 of the power routing circuit 120. And, the power routing circuit 120 has a switch control circuit 124 corresponding to the plurality of lines 122. The lines 122 corresponding to different shell connecting points N1 to N10 and the power module 130 intersect the lines of the switch control circuit 124. Meanwhile, switches 126 are disposed at intersection points of each line 122 and each line corresponding to the switch control circuit 124. In this way, the control circuit 110 may adjust the connection relation between the lines for distributing the power by controlling whether to turn on or turn off each of the switches 126.

Taking the shell connecting point N1 as an example, the shell connecting point N1 is connected with lines N1.1 and N1.2 in the power routing circuit 120. Metal oxide semiconductor field effect transistor (MOSFET) switches (also referred to as MOS switches) are respectively disposed at intersection points of the two lines N1.1 and N1.2 and the lines corresponding to the control circuit 134. The type of the switches disposed on the lines in the power routing circuit 120 is not limited in the invention. When the power routing circuit 120 receives an instruction from the control circuit 110 to output power battery+ from the line N1.1, the MOS switch at the intersection point of the line 122 belonging to Battery+ and the line belonging to N1.1 of the switch control circuit 124 is turned on, such that the power module 130 is electrically connected with the shell connecting point N1. It should be noted that the hardware circuit of the power routing circuit 120 is not limited thereto, and any method for controlling the turning-on and the turning-off of the power to adjust the circuit according to the path table is applicable to the invention.

The shell connecting points N1 to N10 are configured to be connected with other power supply devices or the power transferring device 200, and the power supply device 100 may perform data and power exchange with other power supply devices or the power transferring device 200 and the load device 205 through the shell connecting points N1 to N10.

Figure 4:
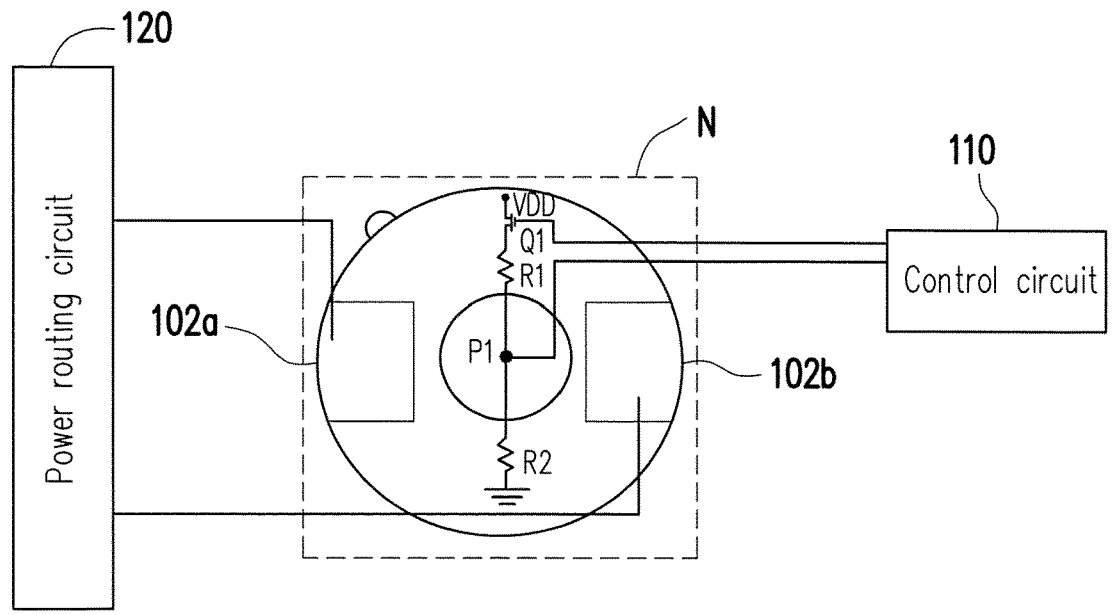
FIG. 4 illustrates a circuit structure of a shell connecting point according to an embodiment of the invention.

Referring to both FIG. 2 and FIG. 4, FIG. 4 illustrates a circuit structure of a shell connecting point according to an embodiment of the invention. Each of the shell connecting points N1 to N10 has two power transmission connecting points 102a and 102b for reading and transmitting the power transmitted through the power routing circuit 120. The number of the power transmission connecting points in the shell connecting points N1 to N10 is not limited in the invention. In other embodiments, the shell connecting points N1 to N10 may include more power transmission connecting points and thereby, the power transferring device 200 and the load device 205 may also be connected with the power supply device 100 in different aspects.

Additionally, each of the shell connecting points N1 to N10 has two resistors, R1 and R2, which are connected in series, where the resistor R1 is connected with a working voltage VDD through a switch Q1, and the resistor R2 is connected to the ground. In the present embodiment, the switch Q1 is an MOS switch, and the switch Q1 is coupled to and controlled by the control circuit 110. In addition, the control circuit 110 is also connected with a node P1 between the resistors R1 and R2 and detects a voltage of the node P1 to determine whether the shell connecting points N1 to N10 are coupled to other power supply devices or the power transferring device 200. It should be noted that in the present embodiment, each of the shell connecting points N1 to N10 may be connected to a power supply device or the power transferring device. However, the invention is not limited thereto, and in other embodiments, the circuit of the shell connecting points of the invention may also be jointly formed by a plurality of connecting points.

Returning to FIG. 2, the power module 130 is coupled to the power routing circuit 120 and provides the power to the load device 205 according to a routing condition of the power routing circuit 120. The power module 130 may be a structural module with a battery holder or a rechargeable battery with a built-in lithium cell, but the invention is not limited thereto. In addition, the memory 140, the flash memory 150 and the indicating means 160 may be selectively disposed in the power supply device 100. The memory 140, the flash memory 150 and the indicating means 160 are respectively coupled to the control circuit 110. The memory 140 provides a memory space required by the control circuit 110 when executing a program. The flash memory 150 stores program codes executed by the control circuit 110 and an identification code of the power module 130. The indicating means 160 is configured to indicate a connection state between the devices. In the present embodiment, the indicating means 160 uses a light-emitting diode (LED) lamp for indication. For example, when the load device 205 and the power supply device 100 are normally connected, the indicating means 160 indicates by green light. When the power supply device 100 is not connected with any device, the indicating means 160 indicates by red light. However, the invention is not limited thereto.

Figure 5:
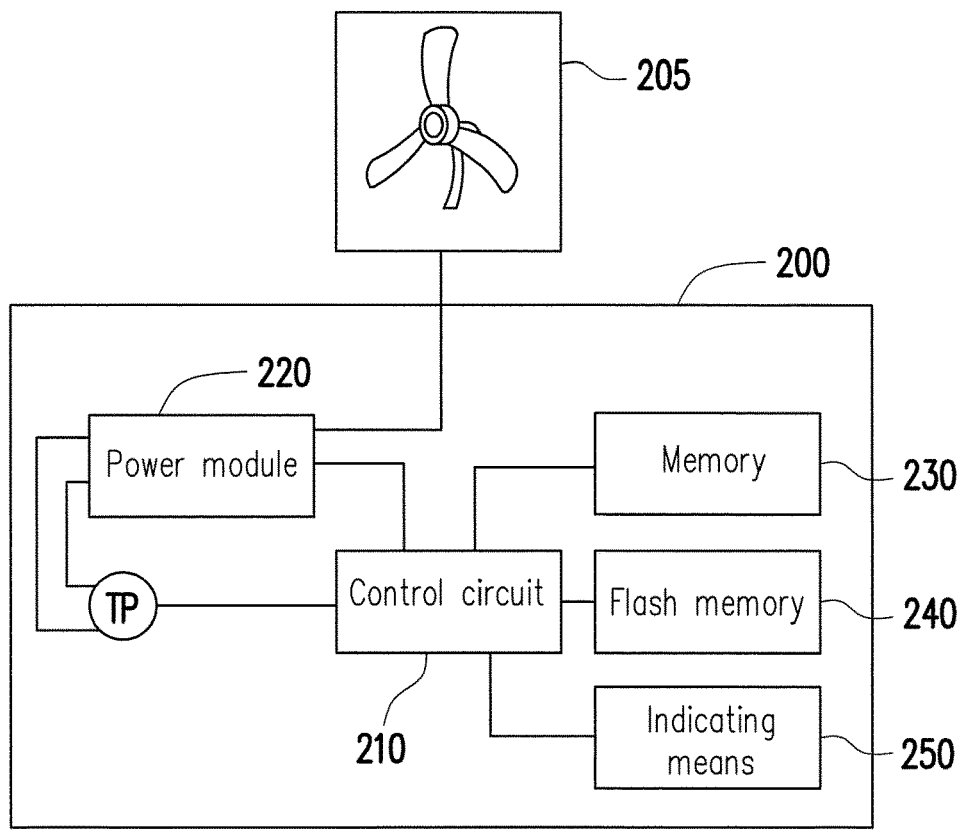
FIG. 5 illustrates an internal structure of the power transferring device according to an embodiment of the invention.

Description with respect to an internal structure of the power transferring device 200 will be set forth below. Referring to FIG. 5, FIG. 5 illustrates an internal structure of the power transferring device 200 according to an embodiment of the invention. The power transferring device 200 includes a control circuit 210, a power module 220, an external connecting point TP, a memory 230, a flash memory 240 and an indicating means 250.

The control circuit 210 is coupled to the external connecting point TP and the power module 220. The control circuit 210 calculates connection topology information according to a connection scenario between the power supply device 100 and other load devices and plans a power supply path according to the connection topology information, thereby deciding a direction and an electric quantity of the power supply route. In the present embodiment, the control circuit 210 performs the path planning according to a topology algorithm and a demand of the load device 205. In the present embodiment, the control circuit 210 may be packaged in a chip or laid out in a circuit form in the power supply transferring device 200.

The power module 220 is coupled to the control circuit 210, the external connecting point TP and the load device 205. The power module 220 receives the power from the power supply device 100, converts it into power adaptive for the load device 205 and provides the converted power to the load device 205. The power module 220 is, for example, a voltage stabilizer, a transformer or the like, but the invention is not limited thereto.

Figure 6:
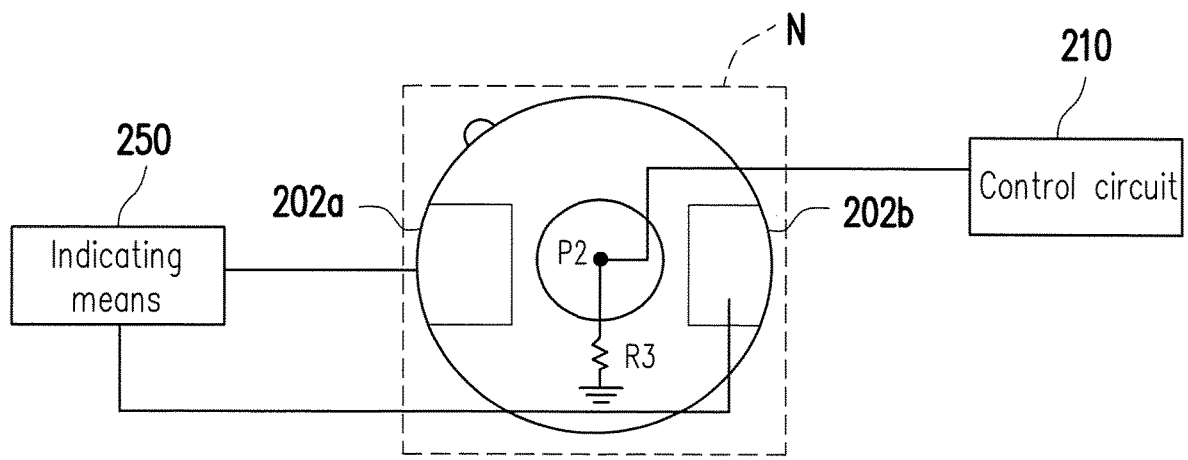
FIG. 6 illustrates a circuit structure of the external connecting point according to an embodiment of the invention.

The external connecting point TP is configured to be connected to the power supply device 100 to read the power from the power supply device 100 and provide the power to the load device 205. And, with the external connecting point TP, the control circuit 210 may perform data transmission with the power supply device 100. Referring to both FIG. 5 and FIG. 6, FIG. 6 illustrates a circuit structure of the external connecting point TP according to an embodiment of the invention. In the present embodiment, the external connecting point TP has two power transmission connecting points, 202a and 202b. The power transmission connecting points 202a and 202b are connected to the power module 220 to transmit the received power to the load device 205 through the power module 220. Being different from the shell connecting points N1 to N10 of the power supply device 100, the external connecting point TP has only one resistor R3, and the resistor R3 is connected to the ground. Additionally, the control circuit 210 is connected to a node P2 near the resistor R3 and detect a voltage thereof.

Returning to FIG. 5, the memory 230, the flash memory 240 and the indicating means 250 may be selectively disposed in the power transferring device 200. The memory 230, the flash memory 240 and the indicating means 250 are respectively coupled to the control circuit 210. The memory 230 provides a memory space required by the control circuit 210 when executing a program. The flash memory 250 stores program codes executed by the control circuit 210 and an identification code of the load device 205. The indicating means 260 is configured to indicate a connection state between the devices. In the present embodiment, indicating means 260 uses an LED lamp for indication, but the invention is not limited thereto.

Figure 7:
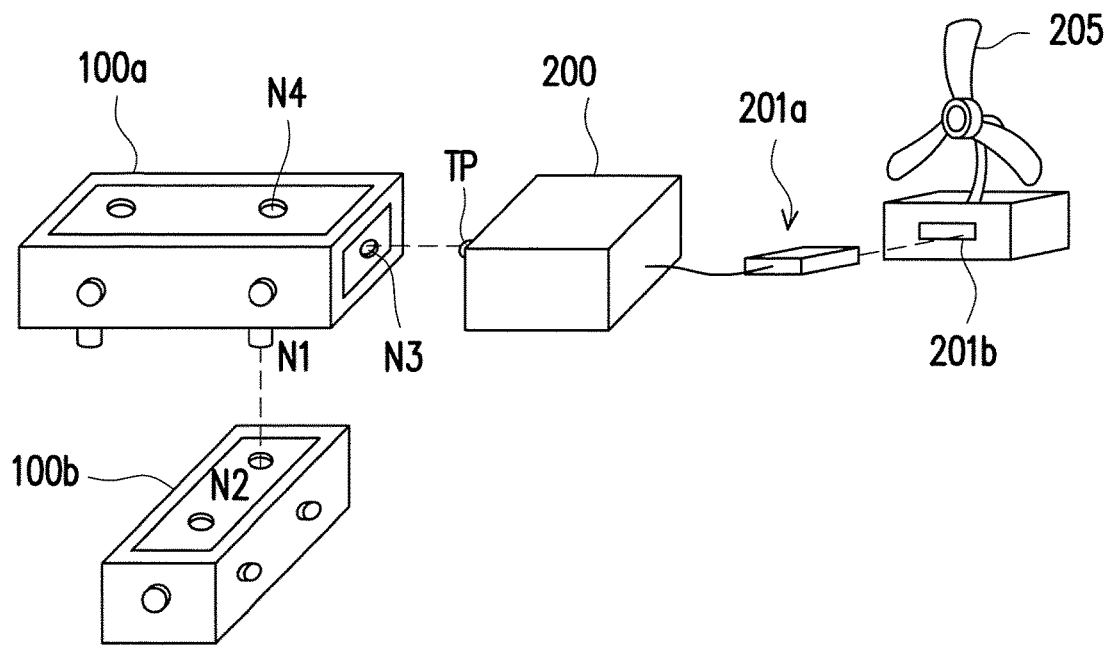
FIG. 7 is a schematic diagram illustrating the connection of the power supply devices, the power transferring device and the load device according to an embodiment of the invention.

Referring to FIG. 7, FIG. 7 is a schematic diagram illustrating the connection of the power supply devices 100a and 100b, the power transferring device 200 and the load device 205 according to an embodiment of the invention. In the present embodiment, each long-side surface of each the power supply devices 100a and 100b has two shell connecting points, e.g., the shell connecting points N1 and N2, and each of the rest of the surfaces has a shell connecting point, e.g., the shell connecting point N4, but the invention is not limited thereto. The shell connecting points N1 to N4 of the power supply device 100 may be designed in various styles, such as locker members capable of being locked to each other, magnets, male and female USB/micro-USB connectors and so on, and any style that can allow two objects to be connected with each other can be applied in the invention. In the present embodiment, the locker members capable of being locked to each other serve as an example for description. In order to achieve mutual connection of the power supply devices 100a and 100b, a part of the shell connecting points of the power supply devices 100a and 100b may be convex locker members, for example, the shell connecting point N1. Another part of the shell connecting points of the power supply devices 100a and 100b may be concave locker members, for example, the shell connecting points N2, N3 and N4. In this way, the shell connecting point N1 of the power supply device 100a may be locked to the shell connecting point N2 of the power supply device 100b, such that the power supply devices 100a and 100b may be connected with each other. The circuit structures of the shell connecting points N1 to N4 of the power supply devices 100a and 100b may refer to FIG. 4 and the related description and will not be repeatedly described.

The power transferring device 200 also has an external connecting point TP and a connection plug 201. The external connecting point TP may be designed in any style capable of being locked to the shell connecting point N3. In the present embodiment, the external connecting point TP is a convex locker member and correspondingly locked to the shell connecting point N3 of the power supply device 100, but the invention is not limited thereto. The circuit structure of the external connecting point TP of the power transferring device 200 may refer to FIG. 6 and the related description and will not be repeated. A connection plug 201a of the power transferring device 200 may be connected to a connection socket 201b of the load device 205. For example, the connection plug 201a and the connection socket 201b may be locker members capable of being locked to each other, magnets, male and female USB/micro-USB connectors and so on, and any style that can allow two objects to be connected with each other can be applied in the invention. In other embodiments, the power transferring device 200 is directly disposed on the load device 205 and electrically connected with the load device 205. In the invention, the connection relation between the power transferring device 200 and the load device 205 is not limited.

It should be noted that the assembly and connection manner of the power supply devices 100a and 100b, the power transferring device 200 and the load device 205 described above are only illustrated as an example. In the applications of the present embodiment, the user may adjust the assembly manner of the power supply devices 100a and 100b, the power transferring device 200 and the load device 205 based on his/her demand. For example, the user may connect the shell connecting point N4 of the power supply device 100a and the external connecting point TP of the power transferring device 200, but the invention is not limited thereto. For descriptive convenience, in the description set forth below, the power transferring device 200 is already connected with the load device 205, and the load device 205 is already connected with the power transferring device 200.

Hereinafter, the scenario where the shell connecting point N1 of the power supply device 100a is connected with the shell connecting point N2 of the power supply device 100b, and the shell connecting point N3 of the power supply device 100a is connected with the shell connecting point N4 of the power transferring device 200 as illustrated in FIG. 7 is taken as an example for describing a method how the control circuit 110 determines whether the power supply device 100a is connected with the power supply device 100b or the power transferring device 200 and operations that should be respectively performed by the control circuits of the power supply device 100a, the power supply device 100b and the power transferring device 200.

[When the Power Supply Device 100a and the Power Supply Device 100b are Connected]

Figure 8:
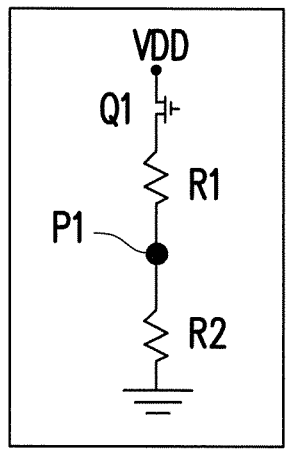
FIG. 8 is a schematic circuit diagram illustrating a scenario when the power supply devices are connected with each other according to an embodiment of the invention.
Figure 8:
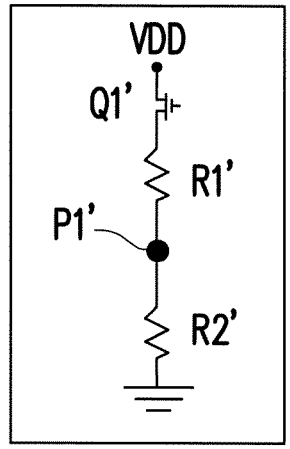

Referring to FIG. 8 first, FIG. 8 is a schematic circuit diagram illustrating a scenario when the power supply devices are connected with each other according to an embodiment of the invention. It should be mentioned first that in the circuit structures of the shell connecting point N1 of the power supply device 100a and the shell connecting point N2 of the power supply device 100b, resistors R1, R1', R2 and R2' have the same resistance size, e.g., 10K ohms (a), but the invention is not limited thereto. Additionally, switches Q1 and Q1' respectively adopts independent random-time switches. In other words, the switches Q1 and Q1' are turned on or turned off respectively at random times. Taking the shell connecting point N1 for example, when the switch Q1 is turned on, the working voltage VDD is provided to the resistors R1 and R2, and in this circumstance, a voltage detected at the node P1 by the control circuit 110 is ½ VDD. When the switch Q1 is turned off, the read working voltage VDD is not applied to the resistors R1 and R2, and in this circumstance, the voltage detected at the node P1 by the control circuit 110 is 0 V.

When the shell connecting points N1 and N2 are connected, the resistors R1, R1' and the resistors R2, R2' between the shell connecting points N1 and N2 respectively form parallel circuits. Additionally, based on the aforementioned random-time switch mechanism, the switches Q1 and Q1' may be turned on or turned off simultaneously or at different times. Thus, four scenarios as listed in Table 1 may occur:

| State of switch Q1 | State of switch Q1' | Voltage of nodes P1 and P1' |
|---|---|---|
| ON | ON | ½ VDD |
| OFF | OFF | 0 V |
| ON | OFF | ⅓ VDD |
| OFF | ON | ⅓ VDD |

Table 1 Shows the Relation Between the Voltage
Detected at Each of the Nodes P1 and P1' and on
and Off States of the Switches Q1 and Q1'

When the switches Q1 and Q1' are simultaneously turned on, at this time, the voltage detected at each of the nodes P1 and P1' is ½ of the working voltage VDD. When the switches Q1 and Q1' are simultaneously turned off, at this time, the voltage detected at each of the nodes P1 and P1' is 0 V since no working voltage VDD is read. When the switch Q1 is turned on, and the switch Q1' is turned off, the resistors R2 and R2' are connected in parallel and form a voltage divider circuit. In this circumstance, the resistance size of the resistors R2 and R2' becomes ½ of the original ones, and the voltage detected at each of the nodes P1 and P1' is ⅓ of the working voltage VDD. Similarly, when the switch Q1' is turned on, and the switch Q1 is turned off, the resistors R2 and R2' are connected in parallel and form a voltage divider circuit. In this circumstance, the resistance size of the resistors R2 and R2' becomes ½ of the original ones, and the voltage detected at each of the nodes P1 and P1' is ⅓ of the working voltage VDD. In this circumstance, the voltage detected at each of the nodes P1 and P1' is 0 V or ½ of the working voltage VDD when the shell connecting points N1 and N2 are not connected. Thus, the control circuit 110, when detecting that the voltage of the nodes P1 and P1' is ⅓ of the working voltage VDD, may obtain that the shell connecting point N1 is connected with the shell connecting point N2 of the power supply device 100b.

After the control circuit 110 determines that the shell connecting point N1 and the shell connecting point N2 are connected with each other, the control circuit of the power supply device 100a and the control circuit of the power supply device 100b further record information related to the shell connecting point N1 and the shell connecting point N2 in power routing tables of their own. The power routing tables record connection scenarios between the power supply devices 100a and 100b and other power supply devices or the power transferring device. In the present embodiment, each power supply device records a power routing table related to itself. Taking the power supply device 100a for example, the power routing table thereof is as below:

| Shell connecting node of itself | Device type | ID | Shell/external connecting point of the connected device | Residual electric quantity |
|---|---|---|---|---|
| N1 | Power supply | 002 | N2 | 6000 mAh |

Table 2 Records a Power Routing Table of a Power
Supply Device

The power routing table records which shell connecting point of the power supply device is connected with another external device, whether the connected external device is a power supply device or a power transferring device, an identification code of the connected external device and through which connection node the connected device is connected. Additionally, if the connected device is a power supply device, the power routing table also records how much the residual electric quantity is.

[When the Power Supply Device 100a and the Power Transferring Device 200 are Connected]

Figure 9:
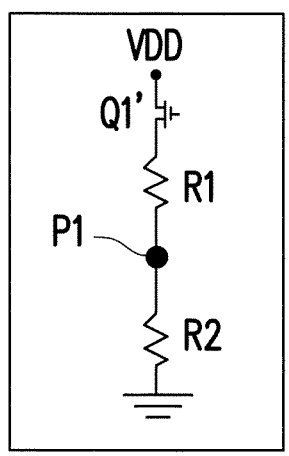
FIG. 9 is a schematic circuit diagram illustrating a scenario when the power supply device and the power transferring device are connected with each other according to an embodiment of the invention.
Figure 9:
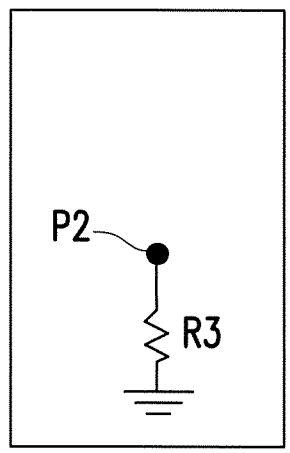

Retelling to FIG. 9 first, FIG. 9 is a schematic circuit diagram illustrating a scenario when the power supply device 100a and the power transferring device 200 are connected with each other according to an embodiment of the invention. It should be mentioned first that in the present embodiment, the resistance size of the resistor R1 of the power supply device 100a is 10 times the resistance size of the load R3 (resistor R3) of the power transferring device 200. For example, the size of the resistor R1 is 10 kΩ, and the size of the load R3 is 1 kΩ.

When the shell connecting point N3 of the power supply device 100a is connected with the external connecting point TP of the power transferring device 200, the resistor R2 and load R3 form a parallel circuit. Additionally, based on the aforementioned random-time switch mechanism, two scenarios as listed in Table 3 may occur:

| State of switch Q1 | Voltage of nodes P1 and P2 |
|---|---|
| ON | 0.1 VDD |
| OFF | 0 V |

Table 3 Shows the Relation Between the Voltage
Detected at Each of the Nodes P1 and P1' and on
and Off States of the Switch Q1

The resistor R2 and the load R3 form a parallel voltage divider circuit. Thus, when the switch Q1 is turned on, the voltage detected at each of the nodes P1 and P2 by control circuit 110 is 0.1 VDD. When the switch Q1 is turned off, at this time, the voltage detected at each of the nodes P1 and P2 is 0V since no working voltage is read. The voltage detected at the node P1 is 0 V or ½ of the working voltage VDD when the shell connecting point N3 is not yet connected with the external connecting point TP of the power transferring device 200. Thus, the control circuit 110, when detecting that the voltage of the node P1 is 1/10 of the working voltage VDD, may obtain that the shell connecting point N1 is connected with the external connecting point TP of the power transferring device 200.

Similarly, after the control circuit 110 determines that the shell connecting point N1 and the external connecting point TP are connected with each other, the control circuit of the power supply device 100a and the control circuit of the power transferring device 200 further record information related to the shell connecting point N1 and the external connecting point TP in power routing tables of their own. The power routing table of the power transferring device 200 recorded by the power supply device 100a is as below, for example:

| Device type | ID | Node | ID of other connected devices | Node for connecting with other devices | Connection order |
|---|---|---|---|---|---|
| Transferring device | 100 | N3 | 003 | TP | 1 |

Table 4 Records the Power Routing Table of the
Power Transferring Device

The power routing table records which shell connecting point of the power transferring device is connected therewith, an identification code of the connected power transferring device, whether the power transferring device is connected with other devices, which the node for the power transferring device to connect with other devices is and a connection order of the power transferring device. The column of connection order of the power transferring device is used to record connection orders of a plurality of power transferring devices when being connected with the power supply device.

It should be noted that in the present embodiment, the power routing table records the device information related to the power supply device and the power transferring device jointly recorded by Table 2 and Table 4. In other embodiments, the power routing table may be one table, and the columns of this power routing table combine the columns of Table 2 and Table 4, but the invention is not limited thereto.

Not only the power supply device 100 has to record information related to the external devices connected therewith, but also the power transferring device 200 has to record the power transferring device connected therewith. In addition, the power transferring device 200 further sends a request to all power supply devices which are mutually connected, thereby obtaining connection scenarios of the information related to all peripheral devices to form connection topology information. The connection topology information may be as below, for example:

TABLE 5

Connection topology information Table

| Device type | ID | Node | ID of other connected devices | Node for connecting with other devices |
|---|---|---|---|---|
| Power supply device | 001 | N1 | 002 | N2 |
| Transferring device | 001 | N3 | 003 | TP |

After the power transferring device 200 obtains the power routing tables provided by the connected power supply devices as shown in Table 2 and Table 4, the power transferring device 200 generates connection topology information as shown in Table 5 according to the power routing tables. The connection topology information records connection relation between all power supply devices and power transferring devices which are connected with each other.

Furthermore, the power transferring device 200 also records its required electric quantity and electric quantities of all the power transferring devices (i.e., the devices which need to power) in the power network. Refer to Table 6 first as below:

TABLE 6

Table of the electric quantity required by the power transferring device

| Power on demand | Priority order of supply |
|---|---|
| One power supply | 3 |
| Two power supplies | 2 |
| Three power supplies | 1 |

In each power transferring device 200, a table, e.g., Table 6, of the electric quantity required thereby is established according to the electric quantity required by the load device 205 which is connected with the power transferring device 200. The table of the electric quantity required by the power transferring device itself records power supplies required thereby and an order of each power supply. For example, referring to Table 6, the power transferring device 200 assigns a priority order of 1 to a scenario where three power supplies are required, assigns a priority order of 1 to a scenario where two power supplies are required and a priority order of 3 to a scenario where one power supply is required. Thus, when the power provided by the power supply device 100 in the power network is sufficient for providing the three power supplies required to the power transferring device 200, the three power supplies are preferentially distributed to the power transferring device. However, if the power provided by the power supply device 100 is insufficient for providing the three power supplies to the power transferring device 200, the power transferring device 200 sequentially provide the two power supplies and the one power supply according to the electric quantity capable of being provided by the power supply device 100.

After the power transferring device 200 is connected with the power supply device 100, the power transferring device 200 also sends a request for obtaining power routing tables to collect the electric quantities required by all the power transferring devices in the power network, which are organized as Table 7:

| Transferring device ID | Power on demand | Priority order of supply |
|---|---|---|
| 003 | One power supply | 1 |
| 004 | One power supply | 3 |
| 004 | Two power supplies | 2 |
| 004 | Three power supplies | 1 |

Table 7 Shows a Power Demand Table of all the Power Transferring Devices in the Power Network Table 7 records, in the power network, the electric quantities required by all the power transferring devices and the priority orders. The power transferring device 200 performs path planning according to the connection topology information as shown in Table 5 and the power demand table as shown in Table 7 to generate a path table.

How a power supply devices and a power transferring devices generate the power routing tables, the connection topology information and the path tables for connecting all the power supply devices and power transferring devices will be described in detail below.

Figure 10:
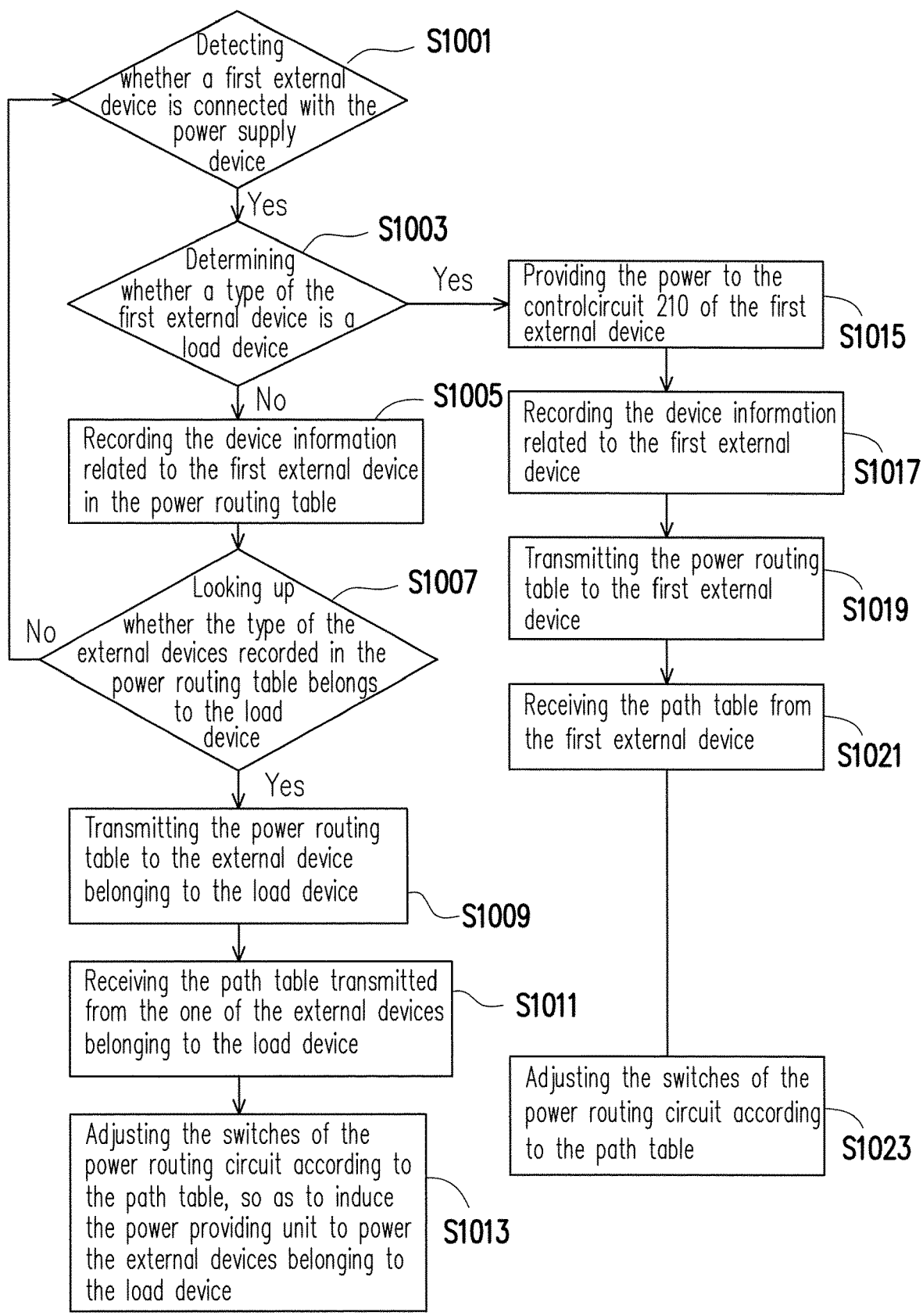
FIG. 10 is a flowchart of a power supply method according to an embodiment of the invention.

First, referring to FIG. 10, FIG. 10 is a flowchart of a power supply method according to an embodiment of the invention. When the power supply device 100 detects that the external devices are connected to the power supply device 100, first, in step S1001, the power supply device 100 continues to detect whether there is a first external device connected with the power supply device 100. When the power supply device 100 detects that the first external device is connected with the power supply device 100, step S1003 is performed, where the control circuit 110 of the power supply device 100 determines whether a type of the first external device is a load device.

In the present embodiment, if the control circuit 110 detects that a voltage of shell connecting point N3 connected to the first external device changes from a first predetermined voltage set to a second predetermined voltage, the control circuit determines the type of the first external device as not the load device. If detecting that the voltage of shell connecting point N3 changes from the first predetermined voltage set to the third voltage, the control circuit 110 determines the type of the first external device as the load device. In the present embodiment, the first predetermined voltage set is the voltage detected by the shell connecting point N1 when the power supply device 100 is not yet connected with another power supply device or another load device, which is, for example, 0 V or ½ of the working voltage VDD. The second predetermined voltage is the voltage detected when the power supply device 100 is connected with another power supply device, which is, for example, ⅓ of the working voltage VDD. The third voltage is the voltage detected when the power supply device 100 is connected with another load device. In the present embodiment, the third voltage is 1/10 of the working voltage VDD. However, the third voltage changes according to load levels of different load devices, and a level of the third voltage is not limited in the invention. In other embodiments, the control circuit determines that the type of the first external device is the load device according to the voltage detected by the control circuit which is neither the first predetermined voltage set nor the second predetermined voltage. The principle of determining the type of the first external device according to the change of the detected voltage has been described in detail with reference to FIG. 8 and FIG. 9 and thus, will not be repeatedly described.

When the type of the first external device is not the load device, the control circuit 110 of the power supply device 100 sends a device information inquiry request to obtain device information related to the first external device. Then, step S1005 is performed, where the control circuit 110 records the device information related to the first external device in the power routing table. The contents recorded in the power routing table have been disclosed in Table 2, Table 4 and the related description in the specification and thus, will not be repeatedly described hereinafter.

The power routing table records the types of all connected external devices. Thus, in step S1007, the control circuit 110 further looks up whether the type of the external devices recorded in the power routing table belongs to the load device. The invention is applied in providing power to the load devices, and the path planning is performed by the control circuit 210 of the power transferring device which is connected with the load device. Thus, if none of the external devices recorded in the power routing table whose type is the load device, step S1001 is returned to, and the control circuit 110 continues to detect whether any other external device is connected with the power supply device. However, if the type of one of the external devices recorded in the power routing table is the load device, the control circuit 110 notifies the external device belonging to the load device that a new power transferring device is added into the power network. The external device belonging to the load device, after receiving the notification, sends a request for obtaining a power routing table to the control circuit 110. In this circumstance, step S1009 is performed, where the control circuit 110 transmits the power routing table to the external device belonging to the load device, so as to update the connection condition of the entire power network with the load device. The one of the external devices which belongs to the load device calculates a path table and returns it to the control circuit 110 of the power supply device 100 according to the received power routing table.

In the present embodiment, when an external device belonging to the load device is connected with the power supply device 100, the power supply device and the load device record a connection order of the load device. For example, when a first load device is connected with the power supply device 100, a serial number, e.g., a serial number 001, for recording the connection order of the load device is given in the power routing table. Then, if there are other load devices are connected with the power supply device 100, the control circuit 110 records the connection order of these load devices in a form of serial numbers. Accordingly, the control circuit 110 may obtain the order of the load devices when being connected with the power supply device 100. In the present embodiment, the control circuit 110 employs the external device, among the external devices, belonging to the load device which is the last one connected with the power supply device 100 as one of the external devices belonging to the load device for calculating and returning the path table, but the invention is not limited thereto. In other embodiments, the control circuit 110 may request for the load device which is the first one connected with the power supply device 100 or give the load device a specific priority order number, but the invention is not limited thereto.

The one of the external devices belonging to the load device, after calculating and obtaining the path table, returns the path table to the control circuit 110. In step S1011, the control circuit 110 receives the path table transmitted from the one of the external devices belonging to the load device. Then, in step S1013, the control circuit 110 adjusts the switches of the power routing circuit according to the path table, so as to induce the power providing unit to power the external device belonging to the load device. The method of adjusting the switches of the power routing circuit has been disclosed in FIG. 3 and the corresponding description in the specification and thus, will not be repeatedly described hereinafter.

If in step S1003, the control circuit 110 of the power supply device 100 determines that the type of the first external device is the load device, step S1015 is performed, where the control circuit 110 provides the power to the control circuit 210 of the first external device. The control circuit 110 of the power supply device 100 sends a device information inquiry request to the control circuit 210, so as to obtain the device information related to the first external device. In step S1017, the control circuit 110 records the device information related to the first external device. Meanwhile, the control circuit 110 also broadcasts the device information related to the first external device to the power supply devices and the load devices in the power network, such that all devices in the power network obtain that the first external device is added into the power network. Then, in step S1019, the control circuit 110 transmits the power routing table to the first external device. The first external device generates the path table according to the power routing table, and in step S1021, the control circuit 110 receives the path table from the first external device. The control circuit 110, in step S1023, adjusts the switches of the power routing circuit according to the path table, so as to induce the power module 130 to power the first external device and the external devices belonging to the load device.

It should be additionally noted that in step S1001, when detecting that the external devices are connected with the power supply device, the control circuit 110 determines whether to temporarily terminate providing the power to the external devices belonging to the load device according to the power supply condition of the power network, so as to reorganize the power supply paths. In step S913 or S923, after adjusting the switches of the power routing circuit according to the path table, the control circuit 110 restarts the power supply of the entire power network, so as to induce the power providing unit to power the external devices belonging to the load device, but the invention is not limited thereto.

Figure 11:
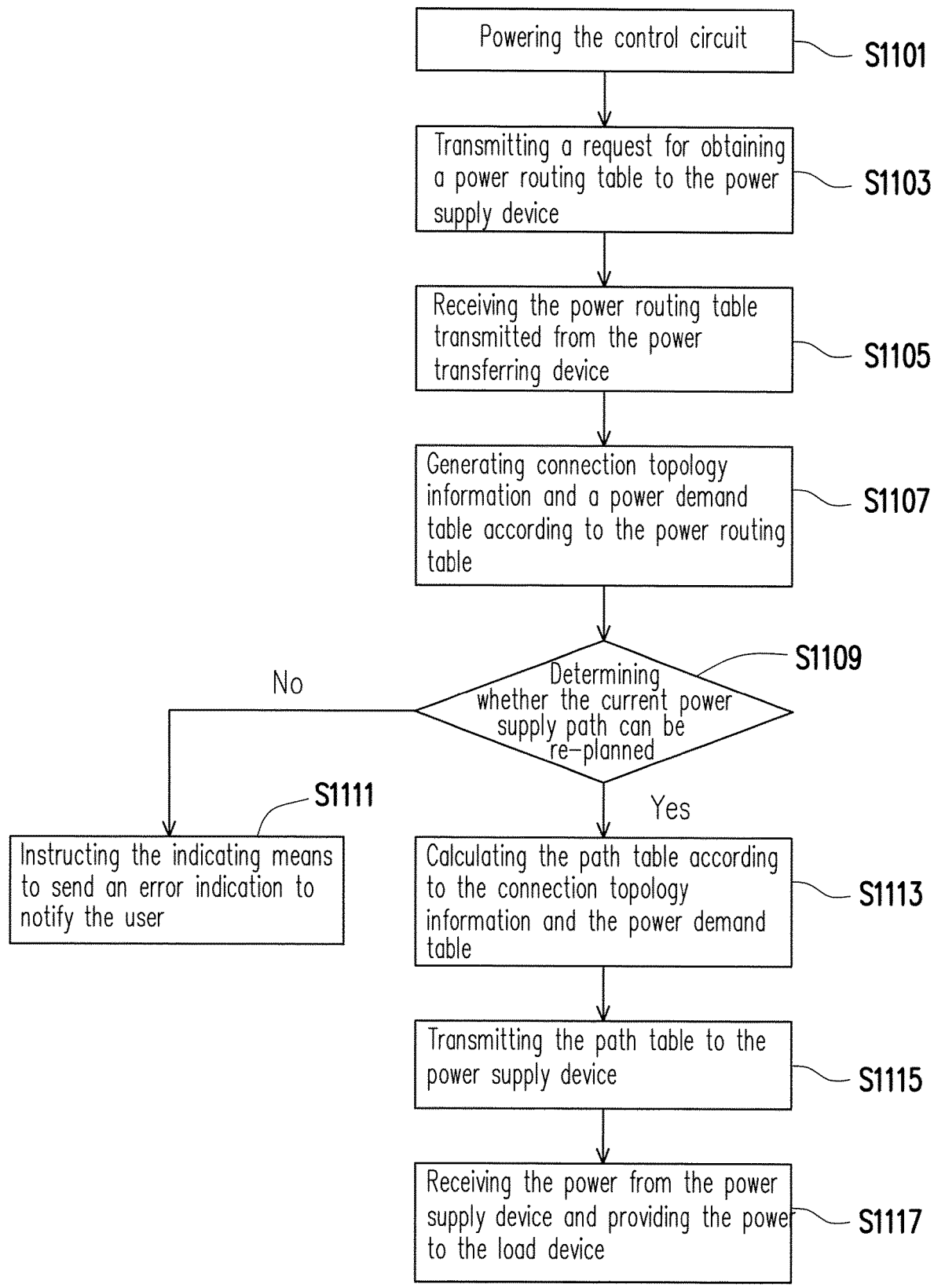
FIG. 11 is a flowchart of a power transferring method according to an embodiment of the invention.

FIG. 11 is a flowchart of a power transferring method according to an embodiment of the invention. Referring to FIG. 11, if the type of the first external device is the load device, when the load device is connected to the power supply device 100 through the power transferring device, in step S1101, the control circuit 210 of the power transferring device connected with the load device is powered. In this circumstance, in step S1103, the control circuit 210 transmits a request for obtaining a power routing table to the power supply device 100 in the power network. The control circuit 110 of the power supply device 100, after receiving the power routing table, transmits the power routing table owned by the power supply device 100 to the power transferring device. In step S1105, the control circuit 210 obtains power routing tables from all power transferring devices. Then, the control circuit 210 performs step S1107 to generate connection topology information and a power demand table according to the power routing table. The contents related to the connection topology information and the power demand table have been described in Table 5 and Table 7 and thus, will not be repeatedly described hereinafter. In step S1109, the control circuit 210 determines whether the current power supply path can be re-planned according to the contents related to the connection topology information and the power demand table owned thereby. If not, the control circuit 210 performs step S1111, where the control circuit 210 instructs the indicating means 250 to send an error indication to notify the user that a connection error occurs. If the control circuit 210 determines that the current power supply path can be re-planned, in step S1113, the control circuit 210 calculates the path table according to the connection topology information and the power demand table. Meanwhile, in step S1115, the control circuit 210 transmits the path table to the power supply device 100. After the control circuit 110 of the power supply device 100 receives the path table, the control circuit 110 controls the switches of the power routing circuit 120 according to the path table, so as to induce the power module 130 to power the first external device. In step S1117, the control circuit 210 receives the power which is provided from the power supply device 110 and is to be provided to the load device.

Figure 12:
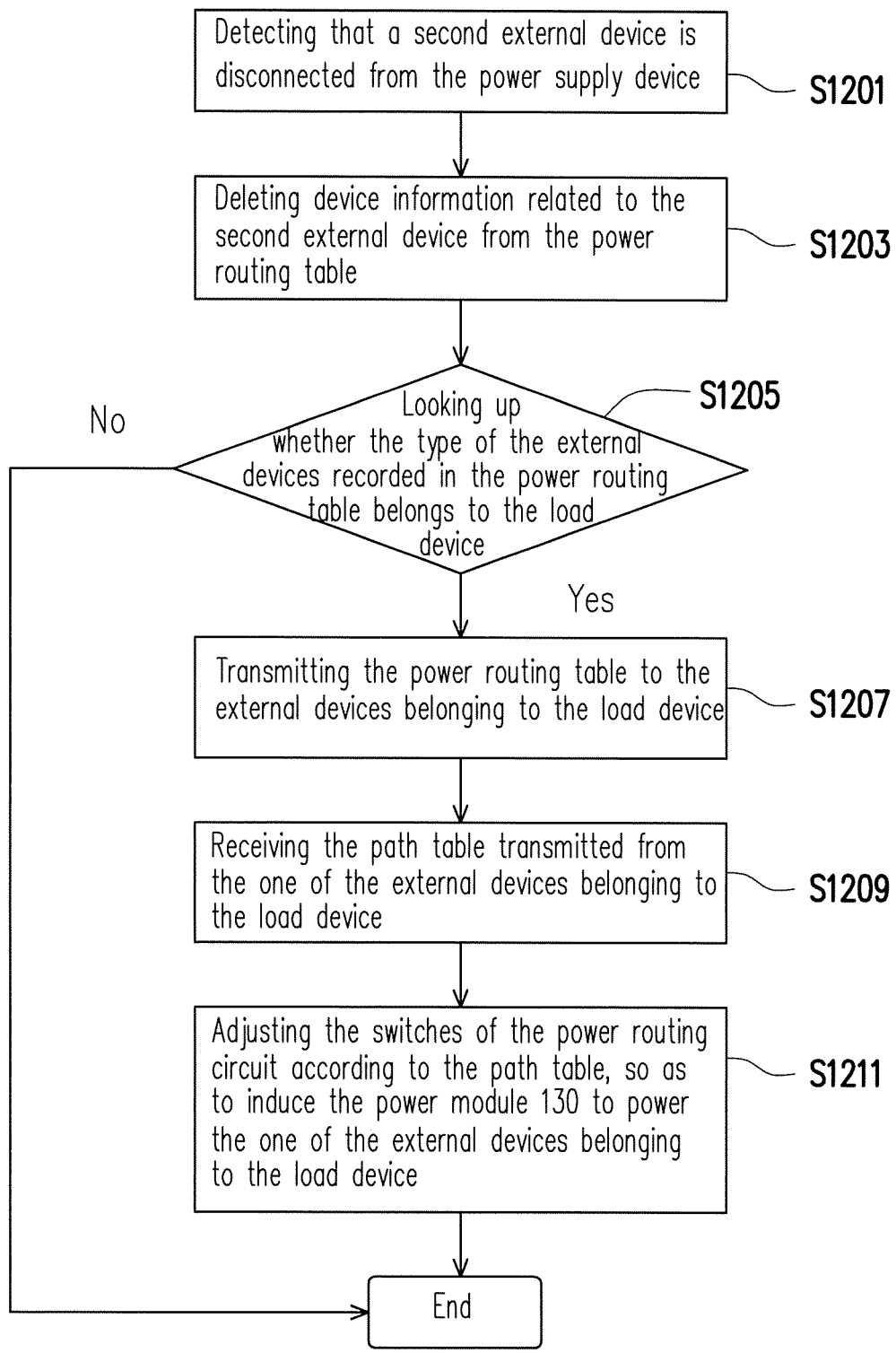
FIG. 12 is a flowchart of a power supply method in a scenario where a device is removed.
Figure 13:
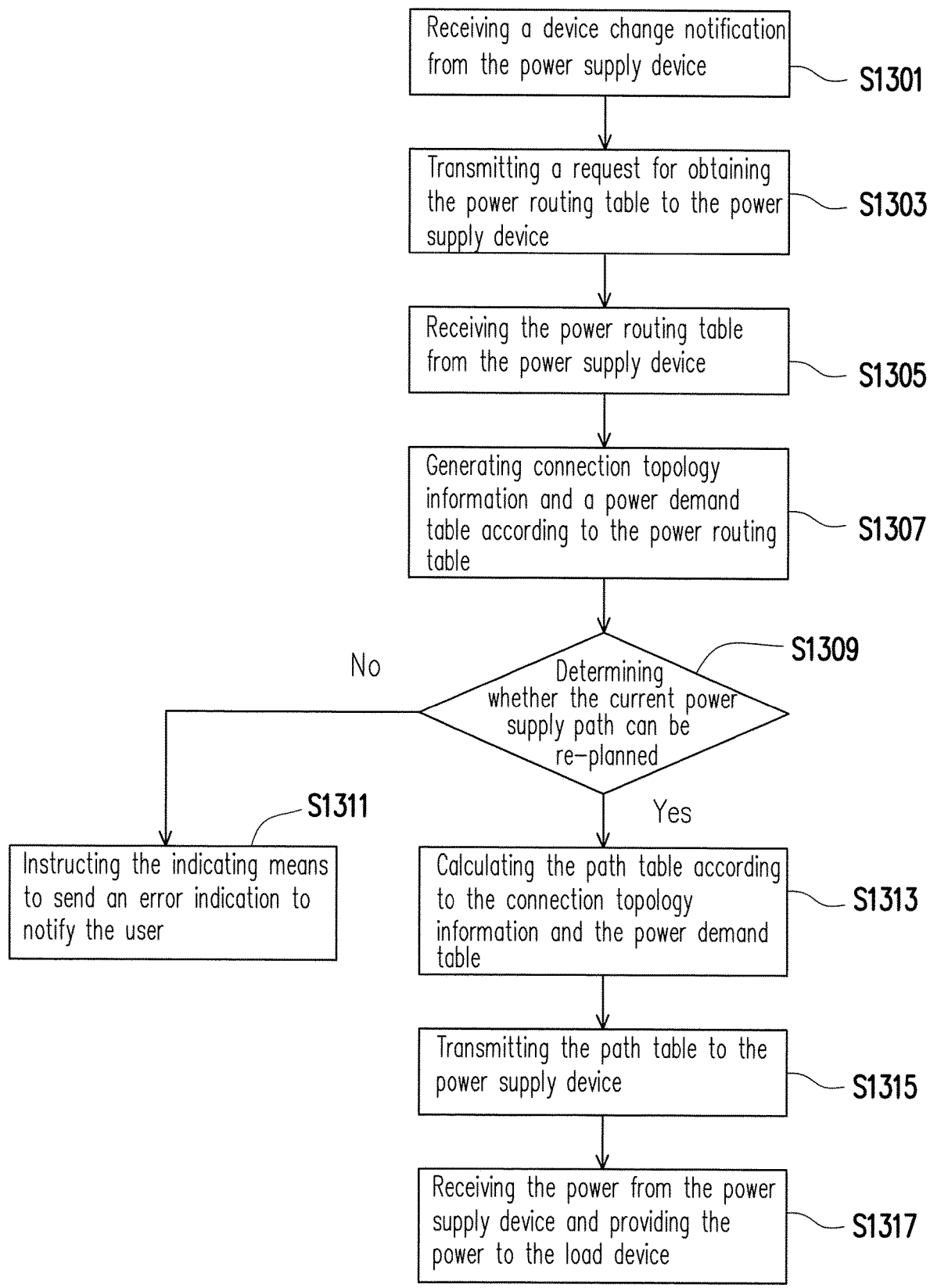
FIG. 13 is a flowchart of a power transferring method in a scenario of a device change according to an embodiment of the invention.

On the other hand, please refer to FIG. 12 and FIG. 13 for a method performed to remove a device from the power network. FIG. 12 is a flowchart of a power supply method in a scenario where a device is removed. First, for the power supply device 100, in step S1201, the control circuit 110 detects that a second external device is disconnected from the power supply device. The second external device as referred to herein may be a power supply device or a load device. In this circumstance, the control circuit 110 performs step S1203 to delete device information related to the second external device from the power routing table. Then, in step S1205, the control circuit 110 further looks up whether the type of the external devices recorded in the power routing table belongs to the load device. If the power routing table does not record the type of any external device as the load device, it indicates that no device needs to be powered. Thus, the power supply device does not have to perform any operation. However, if the power routing table records that the type of one of the external devices is the load device, the control circuit 110 notifies to remove the second external device, among the external devices, belonging to the load device from the power network.

The external device belonging to the load device, after receiving the notification, sends a request for obtaining the power routing table to the control circuit 110. In this circumstance, step S1207 is performed, where the control circuit 110 transmits the power routing table to the external devices belonging to the load device, so as to update the connection condition of the entire power network with the load device. The one of the external devices belonging to the load device calculates a path table according to the received power routing table and returns it to the control circuit 110 of the power supply device 100. The method regarding how to select the one of the external devices belonging to the load device has been described with reference to FIG. 10 and thus, will not be repeatedly described.

The one of the external devices belonging to the load device, after calculating and obtaining the path table, calculates the path table according to the received power routing table and returns it to the control circuit 110 of the power supply device 100. In step S1209, the control circuit 110 receives the path table transmitted from the one of the external devices belonging to the load device. Additionally, in step S1211, the control circuit 110 adjusts the switches of the power routing circuit according to the path table, so as to induce the power module 130 to power the one of the external devices belonging to the load device. The method of adjusting the switches of the power routing circuit has been disclosed in FIG. 3 and the corresponding description in the specification and thus, will not be repeatedly described hereinafter.

Referring to FIG. 13, FIG. 13 is a flowchart of a power transferring method in a scenario of a device change according to an embodiment of the invention. In step S1301, the power transferring device connected with the load device receives a device change notification from the power supply device. The device change notification as referred to herein is sent by the load device when a power supply device is added into the power network, or a power supply device or a power transferring device is removed from the power network. In this circumstance, in step S1303, the control circuit 210 transmits a request for obtaining the power routing table to the power supply device 100 in the power network. The control circuit 110 of the power supply device 100, after receiving the request for obtaining the power routing table, transmits the power routing table owned by the power supply device 100 to the load device. In step S1305, the control circuit 210 obtains the power routing table from the power supply device 100. Then, in step S1307, the control circuit 210 generates connection topology information and a power demand table according to the power routing table. The contents related to the connection topology information and the power demand table have been set forth in Table 5 and Table 7 above and thus, will not be repeatedly described hereinafter. The control circuit 210, in step S1309, determines whether the current power supply path can be re-planned according to the contents of the connection topology information and the power demand table owned thereby. If not, the control circuit 210 performs step S1311, where the control circuit 210 instructs the indicating means 250 to send an error indication to notify the user that a connection error occurs. If the control circuit 210 determines that the current power supply path can be re-planned, in step S1313, the control circuit 210 calculates the path table according to the connection topology information and the power demand table. Meanwhile, in step S1315, the control circuit 210 transmits the path table to the power supply device 100. After the control circuit 110 of the power supply device 100 receives the path table, the control circuit 110 controls the switches of the power routing circuit 120 according to the path table, so as to induce the power providing unit to power the first external device. In step S1317, the control circuit 210 receives the power which is provided from the power supply device 110 and is to be provided to the load device.

In light of the foregoing, the power supply device of the invention can record the device information related to each external device connected therewith in the power routing table. And, when the load device is connected with the power supply device through the power transferring device, the power supply device transmits the power routing table to the power transferring device. The power transferring device can establish the connection topology information and the power demand table according to the power routing table of each power supply device and further calculate the path table, such that the power supply can be deployed in the entire power network according to the path table. Thereby, when the user arbitrarily connects the power supply device with the load device, the power transferring device and the power supply device can cooperate with each other to calculate the optimal power supply path for flexibly distributing the power.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power supply device, configured to be connected with a plurality of external devices, wherein each of the external devices comprises an external connecting point, the power supply device comprising:
    a shell, comprising a plurality of shell connecting points;
    a power providing unit, configured to store and provide power to the external devices;
    a power routing circuit, coupled to the shell connecting points and the power providing unit, and comprising a plurality of switches; and
    a control circuit, connected with the power routing circuit and controlling the switches of the power routing circuit,
    wherein when detecting that the external connecting point of a first external device among the external devices is electrically connected with one of the shell connecting points, the control circuit determines whether a type of the first external device is a load device and records device information related to the first external device in a power routing table,
    if the type of the first external device is the load device, the control circuit transmits the power routing table to the first external device and instructs the power routing circuit to adjust the switches thereof according to a path table returned by the first external device, so as to power the first external device.

2. The power supply device according to claim 1, wherein each of the shell connecting points has a plurality of power transmission connecting points and data transmission connecting points, one of the power transmission connecting points is coupled to a random-time switch to randomly provide a working voltage, and the operation of the control circuit determining whether the type of the first external device is the load device comprises:
    if detecting that a voltage of the shell connecting point connected with the first external device changes from a first predetermined voltage set to a second predetermined voltage, the control circuit determines the type of the first external device as not the load device; and
    if detecting that the voltage of the shell connecting point changes from the first predetermined voltage set to a third voltage, the control circuit determines the type of the first external device as the load device,
    wherein the second predetermined voltage and the third voltage are different.

3. The power supply device according to claim 1, wherein when the type of the first external device is not the load device, the control circuit look up whether the type of the external devices recorded in the power routing table is the load device,
    if the type of one of the external devices is the load device, the control circuit transmits the power routing table to the external device belonging to the load device and receives the path table of the one of the external devices belonging to the load device, and
    the control circuit adjusts the switches of the power routing circuit according to the path table, so as to induce the power providing unit to power the external devices.

4. The power supply device according to claim 1, wherein when the external connecting point of a second external device is electrically disconnected from one of the shell connecting points, the control circuit deletes device information related to the second external device from the power routing table and looks up whether the type of the external devices recorded in the power routing table belongs to the load device,
    if the type of one of the external devices belongs to the load device, the control circuit transmits the power routing table to the external device belonging to the load device and receives the path table of the one of the external devices belonging to the load device, and
    the control circuit adjusts the switches of the power routing circuit according to the path table, so as to induce the power providing unit to power the external device.

5. A power transferring device, disposed with a load device and configured to be connected with a power supply device, so as to induce the power supply device to power the load device, wherein the power supply device comprises a plurality of shell connecting points, the power transferring device comprising:
    an external connecting point, disposed on a surface of the power transferring device;
    a control circuit, coupled to the external connecting point, receiving a power routing table transmitted by the power supply device, generating connection topology information according to the power routing table, calculating a path table according to the connection topology information and transmitting the path table to the power supply device; and
    a power module, receiving power from the power supply device, and converting the power into power required by the load device, wherein the power of the power supply device is provided according to the path table.

6. The power transferring device according to claim 5, wherein when the external connecting point of the power transferring device and one of the shell connecting points of the power supply device are connected, and the control circuit sends a request for obtaining a power routing table to the power supply device and receives the power routing table from the power supply device, wherein when receiving the power routing table from the power supply device, the control circuit establishes the connection topology information and a power demand table according to the power routing table and establishes the path table according to the connection topology information and the power demand table, wherein the control circuit returns the path table to the power supply device and instructs the power supply device to provide the power according to the path table.

7. The power transferring device according to claim 5, wherein when the power transferring device receives a device change notification from the power supply device, the control circuit transmits a request for obtaining a power routing table to the power supply device and receives the power routing table from the power supply device, wherein when receiving the power routing table transmitted by the power supply device, the control circuit establishes the connection topology information and a power demand table according to the power routing table and establishes the path table according to the connection topology information and the power demand table, wherein the control circuit returns the path table to the power supply device and instructs the power supply device to re-provide the power according to the path table.

* * * * *